US008784671B2

(12) United States Patent
Vermeulen

(10) Patent No.: US 8,784,671 B2
(45) Date of Patent: Jul. 22, 2014

(54) METHOD OF MANUFACTURING A PRESS PLATE, A PRESS PLATE, A METHOD OF EMBOSSING A FLOOR PANEL, AND A FLOOR PANEL

(75) Inventor: Bruno Vermeulen, Aldeneik-Maaseik (BE)

(73) Assignee: Spanolux N.V.-Div. Balterio, Sint-Baafs-Vijve (BE)

( * ) Notice: Subject to any disclaimer, the term of this patent is extended or adjusted under 35 U.S.C. 154(b) by 347 days.

(21) Appl. No.: 12/681,220

(22) PCT Filed: Oct. 2, 2008

(86) PCT No.: PCT/EP2008/063249
§ 371 (c)(1), (2), (4) Date: Jun. 7, 2010

(87) PCT Pub. No.: WO2009/043910
PCT Pub. Date: Apr. 9, 2009

(65) Prior Publication Data
US 2010/0260969 A1 Oct. 14, 2010

(30) Foreign Application Priority Data
Oct. 5, 2007 (EP) .................................... 07117972

(51) Int. Cl.

| | |
|---|---|
| ***C03C 15/00*** | (2006.01) |
| ***C03C 25/68*** | (2006.01) |
| ***C23F 1/00*** | (2006.01) |
| ***C25F 3/00*** | (2006.01) |
| ***B44C 1/22*** | (2006.01) |

(52) U.S. Cl.
USPC .................................. 216/11; 216/41; 216/52

(58) Field of Classification Search
USPC ........................................................... 216/11
See application file for complete search history.

(56) References Cited

U.S. PATENT DOCUMENTS

| | | | | |
|---|---|---|---|---|
| 3,668,030 A * | 6/1972 | Broderick | .......................... | 216/9 |
| 4,787,837 A | 11/1988 | Bell | | |
| 5,298,116 A * | 3/1994 | Werthmann et al. | .............. | 216/9 |
| 5,753,722 A * | 5/1998 | Itokawa et al. | ................. | 522/83 |
| 6,129,800 A * | 10/2000 | Brinley | ......................... | 156/209 |

(Continued)

FOREIGN PATENT DOCUMENTS

| | | |
|---|---|---|
| DE | 3120351 | 12/1982 |
| EP | 0256803 | 6/1994 |

(Continued)

OTHER PUBLICATIONS

"Lorenz_Possible_Embodiment", (Illustration by examiner).*

(Continued)

*Primary Examiner* — Binh X Tran
*Assistant Examiner* — Thomas Pham
(74) *Attorney, Agent, or Firm* — Steven M. Koehler; Westman, Champlin & Koehler, P.A.

(57) ABSTRACT

A method of manufacturing a press plate for applying a surface structure onto a floor panel, wherein the press plate includes a press plate surface, comprises the following steps: first fine projections are created on the press plate surface, then the resulting fine projections are covered by a surface treatment resistant material, and subsequently the press plate surface including the resistant material is submitted to a surface treatment.

18 Claims, 2 Drawing Sheets

(56) References Cited

U.S. PATENT DOCUMENTS

| | | | | |
|---|---|---|---|---|
| 2003/0102284 | A1* | 6/2003 | Schmidt et al. | 216/13 |
| 2007/0068898 | A1* | 3/2007 | Lorenz | 216/27 |
| 2008/0248206 | A1* | 10/2008 | Della Torre et al. | 427/331 |

FOREIGN PATENT DOCUMENTS

| | | |
|---|---|---|
| GB | 2054458 | 2/1981 |
| JP | 08072141 | 3/1996 |
| WO | WO 2006063803 | 6/2006 |

OTHER PUBLICATIONS

Search Report of the European Patent Office Patent Office in counterpart foreign application No. PCT/EP2008/063249 filed Oct. 2, 2008.

Written Opinion of the European Patent Office Patent Office in counterpart foreign application No. PCT/EP2008/063249 filed Oct. 2, 2008.

* cited by examiner

METHOD OF MANUFACTURING A PRESS PLATE, A PRESS PLATE, A METHOD OF EMBOSSING A FLOOR PANEL, AND A FLOOR PANEL

CROSS-REFERENCE TO RELATED APPLICATION

The present application is a national stage filing of International patent application Serial No. PCT/EP2008/063249, filed Oct. 2, 2008, and published as WO 2009/043910 in English.

BACKGROUND

The discussion below is merely provided for general background information and is not intended to be used as an aid in determining the scope of the claimed subject matter.

Aspects of the present invention relate to a method of manufacturing a press plate for applying a surface structure onto a floor panel, wherein the press plate includes a press plate surface.

A method of manufacturing a press plate is known in the art. WO 2006/063803, for example, discloses a press plate which has been provided with zones having different degrees of gloss so as to enable manufacturing of floor panels having zones with different degrees of gloss. When manufacturing a floor panel by using such a press plate a wood pattern may be imitated.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

An aspect of the present invention aims to provide a method of manufacturing a press plate which, when used in a method of manufacturing floor panels, provides the opportunity to improve the natural appearance of floor panels.

For this purpose, first fine projections are created on the press plate surface, then the resulting fine projections are covered by a surface treatment resistant material, and subsequently the press plate surface including the resistant material is submitted to a surface treatment.

This method appears to lead to surprisingly good results when the resulting press plate is used for applying a surface structure onto a floor panel, of which the surface structure at depressed portions should be different from that in adjacent portions. It is noted that conventional techniques, such as a silk screen process, did not allow application of the resistant material accurately onto the fine projections. The fine projections on the press plate surface may be elongated projections having a width of less than 1 mm, for example. When the press plate is used for applying a surface structure onto a floor panel, the floor panel will obtain depressed portions imitating natural materials, such as pores in wood. This means that the fine projections may have a great variety of shapes. When using conventional press plates the depressed portions of the floor panels have a similar or lower gloss level than the surrounding panel surface. Due to the present method, floor panels can be manufactured such that those comprise nerves or pores having a higher gloss level than the surrounding panel surface.

The surface treatment may be a chemical surface treatment, for example an etching treatment, but other (chemical) surface treatments are conceivable. An alternative surface treatment may be sand blasting.

The manufacturing method may be performed in several etching steps. The fine projections may be created on the press plate surface by etching the press plate surface adjacent to the intended locations of the fine projections. This means that before a first etching step the press plate surface may be a flat surface, which is provided with etching-resistant material. After the first etching step the fine projections may be formed. At this stage the fine projections may have a surface structure including a limited roughness.

In one embodiment, the etching-resistant material is printed onto the fine projections by a digitally controlled printer. The accuracy of conventional techniques, such as that of a silk screen process appear to be insufficient for providing the etching-resistant material onto the fine projections. Additionally, or instead of etching, a chrome treatment may be performed in order to increase the hardness of the surface structure.

The possibility of alternative surface treatments, as described above, provides a particular embodiment of the method wherein the first fine projections are first created on the press plate surface, then a chrome layer is provided on the press plate for gloss control after which the fine projections are covered by a surface treatment resistant material, and subsequently a chrome surface treatment is performed after which the surface treatment resistant material is removed, wherein the surface treatment is performed such that the gloss level of the fine projections is higher than the surrounding panel surface. This results in a press plate of which the chrome layer of the fine projections creates a higher gloss level than the chrome layer at locations outside the fine projections.

An aspect of the invention also relates to a press plate for applying a surface structure onto a floor panel, wherein the press plate includes a press plate surface provided with fine projections, wherein the surface structure of the fine projections has a degree of smoothness which is higher than that of the press plate surface adjacent to the projections so as to create a lower level of roughness of the press plate surface at the fine projections.

An aspect of the invention also relates to a method of embossing a floor panel by using the above-mentioned press plate.

An aspect of the invention also relates to a floor panel including an upper side, provided with a decoration layer having a surface structure pattern imitating a natural material, such as a wood pattern, wherein the surface structure pattern includes depressed portions, wherein the depressed portions have a different surface structure roughness with respect to the remaining portion of the upper surface.

BRIEF DESCRIPTION OF THE DRAWINGS

Aspects of the invention will hereafter be elucidated with reference to the very schematic drawings illustrating an embodiment of the invention by way of example.

DETAILED DESCRIPTION OF THE ILLUSTRATIVE EMBODIMENTS

Figure 1:
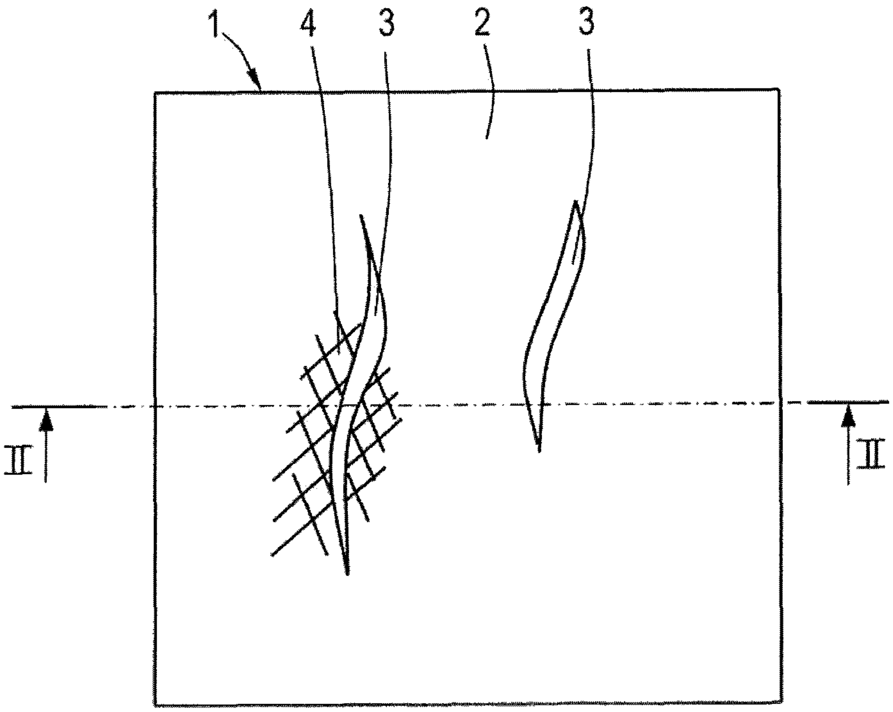
FIG. 1 is a schematic plan view of a portion of an embodiment of the press plate on a large scale according to the invention.

FIG. 1 shows a plan view of a portion of an embodiment of a press plate 1, which in general is made of steel. The press plate 1 includes a press plate surface 2 and is provided with fine projections 3. These fine projections 3 may be made by removing surface material from the press plate surface 2, which initially may be a flat surface, adjacent to the locations where the fine projections 3 are intended. This can be achieved by etching, for example.

When manufacturing floor panels the press plate 1 is pressed onto an upper surface of the floor panel such that depressed portions arise in the upper surface of the panel. In the case of a desired wood pattern the depressed portions may imitate nerves or pores of natural wood.

A further improvement of natural wood imitation is achieved by adapting the upper surface of the panel such that in the nerves or pores the gloss degree is higher than at the remaining portion of the upper surface. This can be achieved by making the surface structure of the upper surface of the floor panel within the nerves or pores smoother than in the remaining portion of the upper surface.

Figure 2:
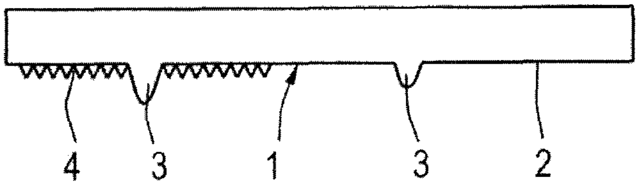
FIG. 2 is a cross-sectional view along the line II-II in FIG. 1.

In order to achieve this the surface structure of the fine projections 3 on the press plate 1 has a degree of smoothness which is higher than that of the press plate surface 2 adjacent to the fine projections 3. This is illustrated in FIGS. 1 and 2 by the rough regions 4.

Such a press plate 1 can be manufactured by first creating the fine projections 3 on the press plate surface 2, then covering the resulting fine projections 3 by an etching-resistant material, and subsequently etching the press plate surface 2. The etching-resistant material can be printed onto the fine projections by a digitally controlled printer, because this can accurately print the material on the fine projections 3. After etching the etching-resistant material can be removed from the press plate surface 2. As a result, depending on the etching method, the fine projections 3 have a different surface structure roughness than the press plate surface 2 adjacent to the fine projections 3.

Figure 3A:
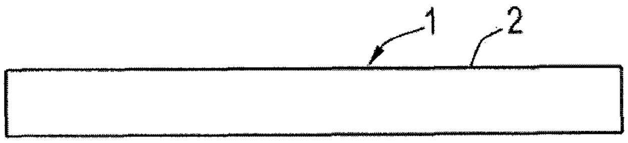
FIG. 3*a-h* are illustrative views, showing subsequent steps of an embodiment of the method according to the invention.
Figure 3B:
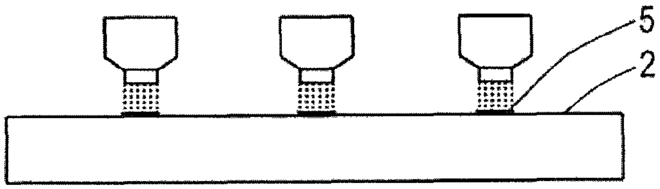
Figure 3C:
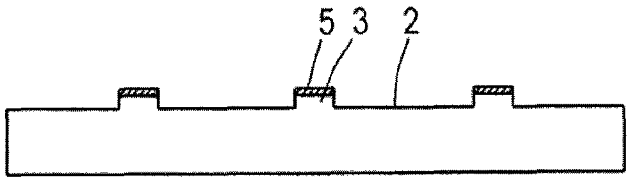
Figure 3D:
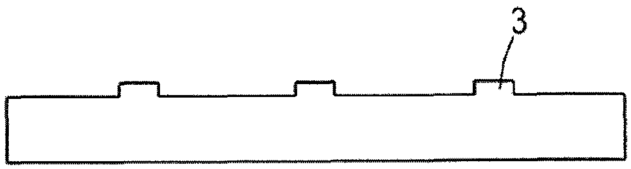
Figure 3E:
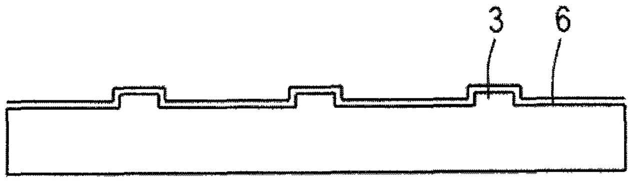
Figure 3F:
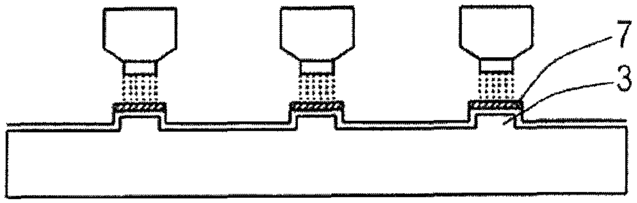
Figure 3G:
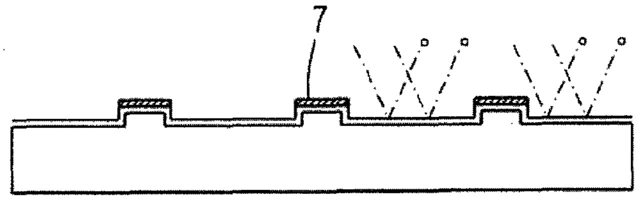
Figure 3H:
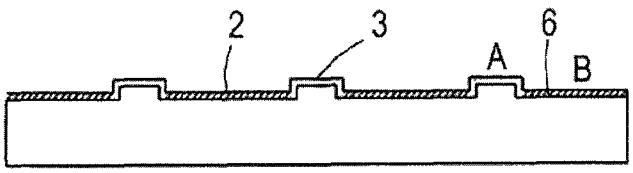

A possible manufacturing method is shown in subsequent steps in FIGS. 3*a* to 3*h*. FIG. 3*a* shows a steel plate 1 having a flat press plate surface 2. Etching-resistant material 5 is applied onto the press plate surface 2, see FIG. 3*b*. Then, the press plate surface 2 is submitted to an etching treatment, resulting in a surface 2 including fine projections 3 as shown in FIG. 3*c*. FIG. 3*d* shows the condition after removing the etching-resistant material 5. Subsequently, the press plate surface 2 is provided with a chrome layer 6 for gloss control, see FIG. 3*e*. In this condition the entire press plate surface 2 has the same gloss level. Then, a surface treatment resistant material 7 is applied onto the press plate surface 2 at the fine projections 3, see FIG. 3*f*. This is performed by a digitally controlled printer so as to accurately cover the fine projections 3. FIG. 3*g* illustrates a sand blasting treatment as a surface treatment of the press plate surface 2. Thus, in this case the surface treatment resistant material 7 is not or only partly removed by sand blasting. As a result, after removing the surface treatment resistant material 7 the press plate surface 2 includes fine projections 3 having a low surface roughness (A) and surrounding portions having a high roughness (B), see FIG. 3*h*. Of course, the step of sand blasting may be replaced by a chemical surface treatment such as etching, wherein the surface treatment resistant material comprises an etching resistant material.

From the foregoing, it will be clear that the invention provides a method of manufacturing a press plate, wherein the resulting press plate provides the opportunity to improve the natural appearance of floor panels.

The invention is not limited to the example shown in the drawings and described hereinbefore, which may be varied in different manners within the scope of the claims and their technical equivalents. For example, the press plate may be a roller instead of a flat plate. Furthermore, the press plate is not only suitable for applying patterns of wood on floor panel, but also for other natural materials such as stone and the like.

The invention claimed is:

1. A method of manufacturing a press plate for applying a surface structure onto a floor panel, wherein the press plate includes a press plate surface, the method comprising:
- creating fine projections on the press plate surface,
- subsequently providing a chrome layer on the press plate surface to create the same gloss level on the press plate surface on the areas having the fine projections and the areas adjacent the fine projections,
- covering the fine projections with a surface treatment resistant material, and
- submitting the press plate surface including the surface treatment resistant material to a surface treatment such that press plate surface structure at the fine projections is different from that in adjacent portions.

2. The method according to claim 1, wherein the surface treatment is a chemical surface treatment.

3. The method according to claim 2, wherein the chemical surface treatment is an etching treatment.

4. The method according to claim 1, wherein creating the fine projections on the press plate surface comprises etching the press plate surface adjacent to intended locations of the fine projections.

5. The method according to claim 1 and further comprising removing the surface treatment resistant material from the press plate surface after the surface treatment.

6. The method according to claim 1, wherein covering the fine projections with the surface treatment resistant material comprises printing the surface treatment resistant material onto the fine projections.

7. The method according to claim 1, wherein after submitting the press plate surface including the surface treatment resistant material to the surface treatment, the press plate surface structure at the fine projections is such that the gloss level is higher than in adjacent portions.

8. The method according to claim 1, wherein the fine projections on the press plate surface are elongated projections having a width of less than 1 millimeter.

9. The method according to claim 1, wherein the surface treatment is a sand blasting treatment.

10. A method of manufacturing a press plate for applying a surface structure onto a floor panel, wherein the press plate includes a press plate surface having fine projections projecting away from adjacent surface portions, the method comprising:
- providing a chrome layer on the press plate surface on the areas having the fine projections and the adjacent surface portions before the fine projections are covered by a surface treatment resistant material to create the same gloss level on the press plate surface on the areas having the fine projections and the adjacent surface portions, subsequently covering the same gloss level on the fine projections with surface treatment resistant material, and submitting the press plate surface including the surface treatment resistant material to a surface treatment such that at least some the surface treatment resistant material remains and the press plate surface structure adjacent the fine projections is different from that under the surface treatment resistant material.

11. The method according to claim 10, wherein the surface treatment is a chemical surface treatment.

12. The method according to claim 11, wherein the chemical surface treatment is an etching treatment.

13. The method according to claim 10 and further comprising removing the surface treatment resistant material from the press plate surface after the surface treatment.

14. The method according to claim 10, wherein covering the fine projections with the surface treatment resistant material comprises printing the surface treatment resistant material.

15. The method according to claim 10, wherein after submitting the press plate surface including the surface treatment resistant material to the surface treatment, the press plate surface structure at the fine projections is such that the gloss level is higher than in adjacent portions.

16. The method according to claim 10, wherein the fine projections on the press plate surface are elongated projections having a width of less than 1 millimeter.

17. The method according to claim 10, wherein the surface treatment is a sand blasting treatment.

18. The method according to claim 10 wherein the surface treatment is a chrome surface treatment.

* * * * *